(No Model.)
G. M. GITHENS.
DRILLING STONE.
No. 553,307. Patented Jan. 21, 1896.
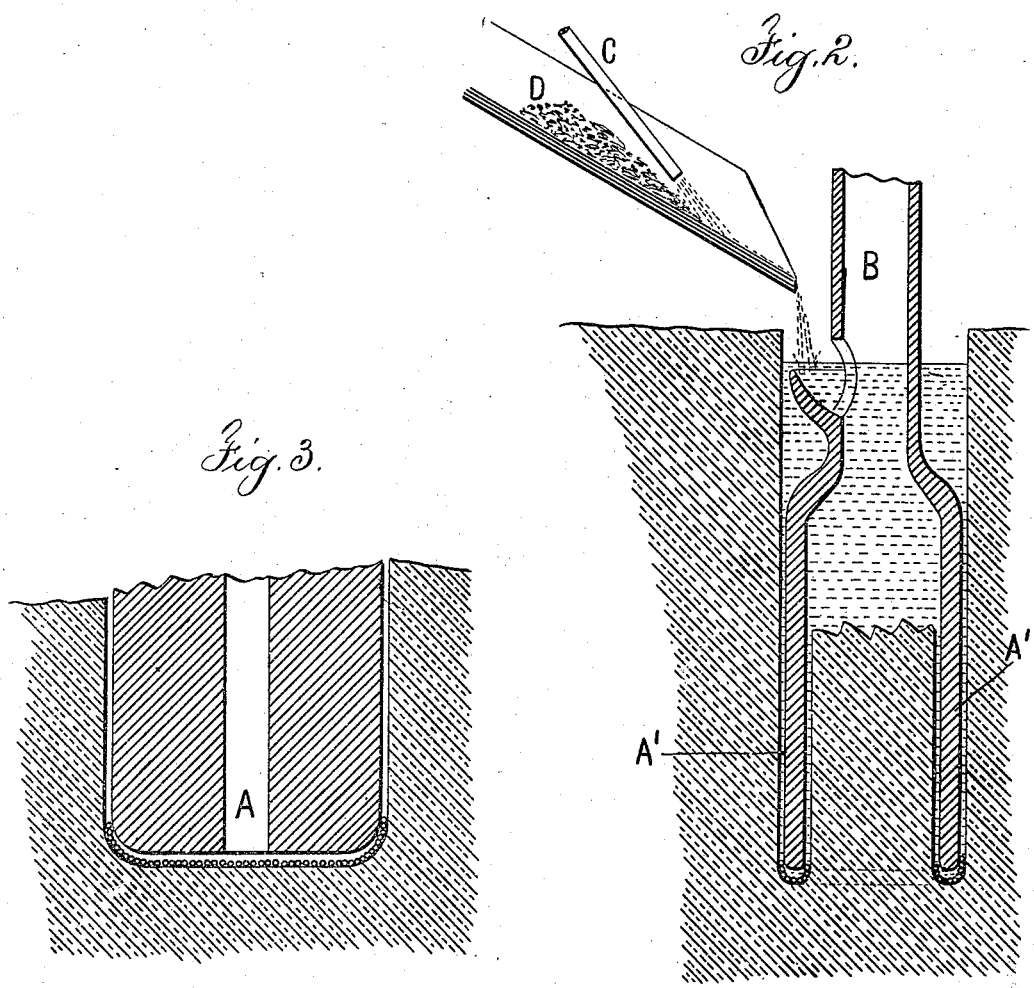
Witnesses
Chas H. Smith
J. Staib
Inventor
George M. Githens
per
Lemuel W. Serrell
atty

UNITED STATES PATENT OFFICE.

GEORGE M. GITHENS, OF BROOKLYN, NEW YORK.

DRILLING STONE.

SPECIFICATION forming part of Letters Patent No. 553,307, dated January 21, 1896.

Application filed March 28, 1894. Serial No. 505,367. (No model.)

*To all whom it may concern:*

Be it known that I, GEORGE M. GITHENS, a citizen of the United States, residing at Brooklyn, in the county of Kings and State of New York, have invented an Improvement in Drilling Stone, of which the following is a specification.

In Letters Patent No. 371,679, granted to me October 18, 1887, a drill is represented having a substantially flat end to be brought into contact with the rock to be drilled percussively in consequence of the reciprocation of the drill with rapidity, and in said patent provision was made for supplying water into the hole, in order that the finely-powdered rock might be washed out by the action of the drill.

In drilling stone, diamonds have in some instances been set into a tube that has been rotated, and in other instances fine pieces or grains of steel have been supplied into the hole and used for abrading the rock by the rotating tube, and water has been supplied into the tube.

When a reciprocating drill is made use of such as set forth in my aforesaid patent, a risk sometimes occurs of the drill wedging into the rock in consequence of the abrading action being rapid at the end of the tool only, the hole produced not being sufficiently large for a free movement of the drill.

I make use of a tubular drill having a contracted tubular upper end with a hole and an outwardly-projecting lip, and water and granular material, such as small pieces of hard steel, are supplied into the hole, and as they pass down part of such granular material is directed by the lip into the interior of the drill to insure the proper proportion inside and outside the tubular drill. When in operation the granular material disintegrates the rock at the inner as well as the outer surfaces to keep the tubular drill free, and at the same time the rock is penetrated by the blow of the substantially flat end of the drill upon the granular material and rock.

In the drawings, Figure 1 represents a flat-faced drill similar to that shown in my aforesaid patent. Fig. 2 is a section representing a tubular drill within the rock and means for supplying water and the granular material into the hole, and Fig. 3 is a section of the drill shown in Fig. 1, and Fig. 4 is a plan sectional view of an elliptical tubular drill.

It is to be understood that any suitable devices are employed for reciprocating the drill with the proper rapidity and for producing a series of rapid blows upon the rock by the end of the drill with the tubular drill A', Fig. 2. A core is left within the tube, which is to be broken away and removed, the same as in diamond and other drills.

The stem B of the drill is of any suitable character and connected to the head of the drill by welding or otherwise, and at C is represented a water-supply, and at D a means for supplying into the hole granular material—such as small pieces of hard steel, sand or other suitable substances—to be carried into the drill-hole by the action of the water, and as the drill is reciprocated, the granular material intervening between the sides of the drill and the interior of the bore, the hole is enlarged sufficiently around the drill to allow the same to play freely without the risk of binding or wedging into the hole, and the granular material intervening between the end of the drill and the surface of the rock is driven into the rock by the concussion thereupon of the drill, and the water being present the particles of granular material are alternately loosened and driven into the rock in such a way as to cut away, abrade and remove the rock with rapidity, and the pulverulent material is washed out by the action of the water, and when fine pieces of steel are made use of the gravity of these pieces is usually sufficient to cause them to remain at or near the bottom portion of the hole until they are no longer useful for the purposes aforesaid.

In Fig. 3 I have represented the substantially flat end of the drill A as having rounding edges, and I find it advantageous to make the drill with the edges rounding, although the edges will wear rounding and advantageously so in use.

It will be observed that as the drill approaches the bottom of the hole the particles of steel or similar material intervening between the drill and the stone are driven outwardly by the rounding portions of the edges before the force of the blow is finally expended in driving such particles against the bottom of the hole. Hence the first portion of the blow is really expended in enlarging the hole so as to make the drill run freely, and in some instances I find it advantageous to score the face of the drill with comparatively-shallow grooves or channels, which may be parallel or crossing each other, and these grooves promote the rapidity of operation in consequence of concentrating the force of the blow upon some of the particles of steel more than upon others, thus producing a movement between the particles themselves as they lie upon the bottom of the drill-hole and prevent such particles of steel or other material becoming packed and hard, and it is to be borne in mind that only a small quantity of such granular material is to be supplied from time to time, because too much of such granular material would interfere with the operation of the drill.

I have represented a central hole in each drill, which hole advantageously extends up through the drill, in order that a circulation of the water and the granular material may be promoted by the reciprocation of the drill, and I find that where the core is not large it will break off by the concussion and will be ground to powder by the succeeding blows of the drill. I also supply the water and the granular material in such a manner that the water and granular material will pass principally through the tubular portion of the drill, so that the circulation of water may be from the center outwardly, in order that the pulverulent material resulting from the abrasion of the rock may be washed out freely with the water and run away at the top of the drill-hole, and with this object in view the water and granular material may be supplied into the tube B or may pass in through a hole at one side, as indicated in Fig. 2, there being a lip to catch any falling granular material and return it into the tube of the drill in either of the forms shown.

The granular material used with the tubular drill effects a clearance inside as well as outside the tube.

The tube made use of by me may be cylindrical, polygonal or of any desired shape. In Fig. 4 I have represented the same as flattened so as to drill an elongated hole, which is advantageous, as it lessens the loss in the stone.

In consequence of using particles of steel or other granular material and reciprocating the drill there is comparatively little wear on the drill and it does not require to be tempered as hard as heretofore usual in drills. Holes drilled in this manner in stone are available either in blasting, wedging or otherwise splitting stone.

I claim as my invention—

1. A tubular drill elliptical in section and having an approximately flat lower end, a tubular body of smaller diameter and a lateral inlet for the passage of water and granular cutting material such as small pieces of hard steel, substantially as specified.

2. A tubular drill having an approximately flat lower end, a tubular body of smaller diameter and a lateral inlet with an outwardly projecting lip for the passage of water and granular cutting material such as small pieces of hard steel into the tubular drill, substantially as specified.

Signed by me this 26th day of March, 1894.

GEORGE M. GITHENS.

Witnesses:
 GEO. T. PINCKNEY,
 A. M. OLIVER.